UNITED STATES PATENT OFFICE.

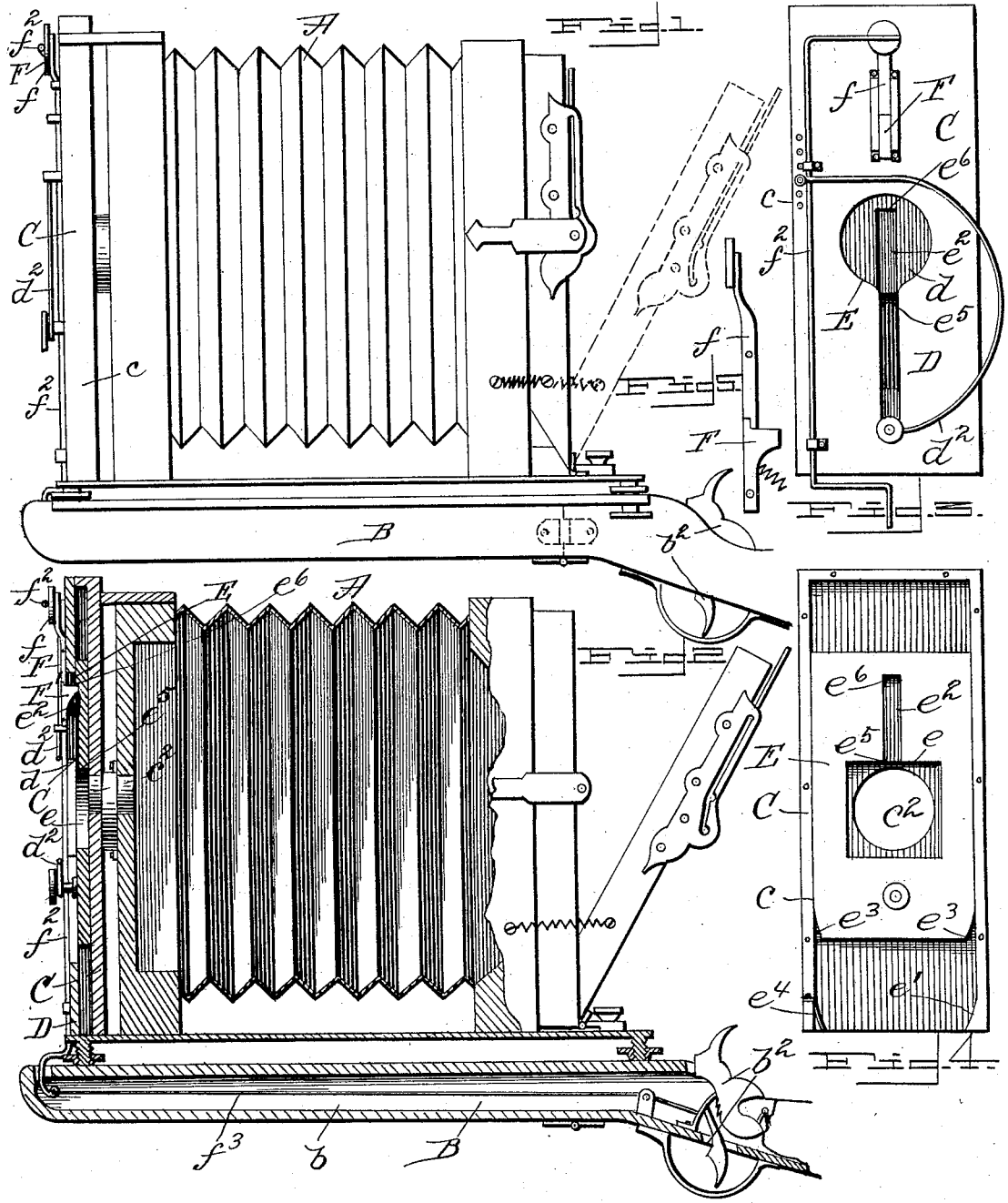

ERSKINE DECKER, OF CASSOPOLIS, MICHIGAN.

CAMERA-SHUTTER.

SPECIFICATION forming part of Letters Patent No. 507,790, dated October 31, 1893.

Application filed October 15, 1892. Serial No. 449,003. (No model.)

*To all whom it may concern:*

Be it known that I, ERSKINE DECKER, a citizen of the United States of America, residing at Cassopolis, in the county of Cass and State of Michigan, have invented certain new and useful Improvements in Cameras, of which the following is a specification.

This invention relates to certain new and useful improvements in camera shutters, the object of the invention being to provide mechanism in a device of this class, by which the operation of the shutter shall be controlled to effect either an instantaneous or a time exposure: furthermore, means by which the structure, lenses, &c., shall be effectually relieved from all shocks, jarring, &c., occasioned by the descent of the shutter; furthermore, means by which the shutter slide may be operated by gravity, spring action or both, and finally the object of the invention resides in the provision of a simple and comparatively inexpensive construction and one that shall prove thoroughly efficient and satisfactory in use.

With these objects in view, the invention consists in various novel details of construction, combinations and arrangements of elements to be hereinafter more fully set forth and claimed.

In describing the invention in detail, reference is had to the accompanying drawings forming part of this specification wherein like letters indicate corresponding parts in the several views, in which—

Figure 1— is a view in elevation of one form of device, embodying my improvements. Fig. 2— is a view in central longitudinal section of the same. Fig. 3— is a view in front elevation of the shutter detached. Fig. 4— is a similar view with the face plate shown removed. Fig. 5— is a view in detail of the trip-dog and operating lever.

In the drawings: A— indicates the ordinary form of camera, mounted on a support —B—, here shown as a gun stock provided with a longitudinal bore —$b$— and a trigger —$b^2$—.

The shutter —C— comprises a casing —$c$— having formed therein an opening —$c^2$—, a removably secured face plate —D— adapted for inclosing the shutter-slide —E— within the casing, and provided with a coinciding opening —$d$— and a slide supporting catch —F—. This slide —E— has formed therein an opening —$e$— and a shallow groove —$e^2$—, the former in transit, coinciding with the openings —$c^2$— and —$d$— of the casing and face plate respectively; and being also provided with rounded or beveled edges —$e^3$— engaging a correspondingly formed surface and a friction spring —$e^4$— arranged at the lower end of the casing. Thus, the shock resulting from the rapid descent of the shutter, will be entirely absorbed by the spring before reaching the base plate and the structure protected thereby. At the upper end of the opening and groove —$e$—$e^2$— are formed shoulders or stops —$e^5$—$e^6$— adapted to be engaged by the pivotally secured trip-dog —F'—; the latter projects through a slot in the face plate, (as shown in Fig. 2.) and may be controlled and operated by the trigger —$b^2$— or other device, through a series of levers —$f$—$f^2$— and a cord —$f^3$— forming a connection therewith.

The operation of the device is as follows: Assuming the slide to be elevated and supported by the engaging projection of the trip-dog, as above described, it is within the power of the operator to obtain a time or an instantaneous exposure, whichever is desired; that is to say, for the former, a slight pressure will prove sufficient to effect a disengagement of the dog from the shoulder —$e^5$— and allow the spring —$d^2$— to act, causing the slide to drop and the several openings to coincide, it being caught and retained at such height by an engagement between the dog and the second shoulder —$e^6$—. And for the latter it will be readily apparent that an increased pressure on the trigger will cause the dog to be drawn from under the stop $e^5$ and allow for a rapid and unobstructed descent of the shutter.

Having thus fully described my invention, what I claim, and desire to secure by Letters Patent, is—

In a photographic camera shutter the combination with a casing having a removable face plate and provided interiorly with guides or ways, of a photographic shutter slide slidingly mounted in the casing and having the lower corners thereof rounded to engage a spring friction stop arranged in the path of travel of the shutter, an adjustably tensioned impelling spring connected with the shutter, a trip dog normally engaging one of a series of stops of the shutter and a trip lever operatively connected with the said dog whereby the latter may be operated, as specified.

In testimony whereof I affix my signature in presence of two witnesses.

ERSKINE DECKER.

Witnesses:
 MATTHEW T. GARVEY,
 A. W. REED.